(12) United States Patent
Narayanan et al.

(10) Patent No.: US 8,467,285 B2
(45) Date of Patent: *Jun. 18, 2013

(54) NO SPLIT VIRTUAL CHASSIS BASED ON PASS THROUGH MODE

(75) Inventors: Kumaran Narayanan, San Ramon, CA (US); Peter Kwok, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/210,143

(22) Filed: Aug. 15, 2011

(65) Prior Publication Data

US 2011/0299385 A1    Dec. 8, 2011

Related U.S. Application Data

(63) Continuation of application No. 12/487,888, filed on Jun. 19, 2009, now Pat. No. 8,023,404.

(51) Int. Cl.
    *G06F 11/00*      (2006.01)
(52) U.S. Cl.
    USPC ......................................................... 370/216
(58) Field of Classification Search
    USPC .................................. 370/216–228, 241–253
    See application file for complete search history.

(56) References Cited

U.S. PATENT DOCUMENTS

| 6,023,471 | A | 2/2000 | Haddock et al. |
|---|---|---|---|
| 6,567,403 | B1 | 5/2003 | Congdon et al. |
| 7,178,052 | B2 | 2/2007 | Hebbar et al. |
| 7,706,364 | B2 * | 4/2010 | Smith et al. ................... 370/389 |
| 2005/0066216 | A1 * | 3/2005 | Hebbar et al. ..................... 714/1 |
| 2005/0105560 | A1 * | 5/2005 | Mann et al. ................... 370/503 |
| 2007/0183313 | A1 | 8/2007 | Narayanan et al. |
| 2008/0181196 | A1 * | 7/2008 | Regan et al. ................... 370/351 |
| 2008/0275975 | A1 | 11/2008 | Pandey et al. |
| 2009/0086620 | A1 | 4/2009 | Fowler et al. |

OTHER PUBLICATIONS

Co-Pending U.S. Appl. No. 12/487,888, filed Jun. 19, 2009 entitled "No Split Virtual Chasis Based on Pass Through Mode" by Naryanan et al., 35 pages.

* cited by examiner

*Primary Examiner* — Frank Duong
(74) *Attorney, Agent, or Firm* — Harrity & Harrity, LLP

(57) ABSTRACT

A method includes operating in a normal mode to receive and transmit packets, where the network device is one of multiple network devices that operate as a virtual chassis, where the virtual chassis corresponds to a single logical network device, and detecting when the network device crashes. The method further includes initiating a resetting process and operating in a pass through mode, during the resetting process, where the pass through mode permits packets to be received and transmitted to the network devices of the virtual chassis.

20 Claims, 11 Drawing Sheets

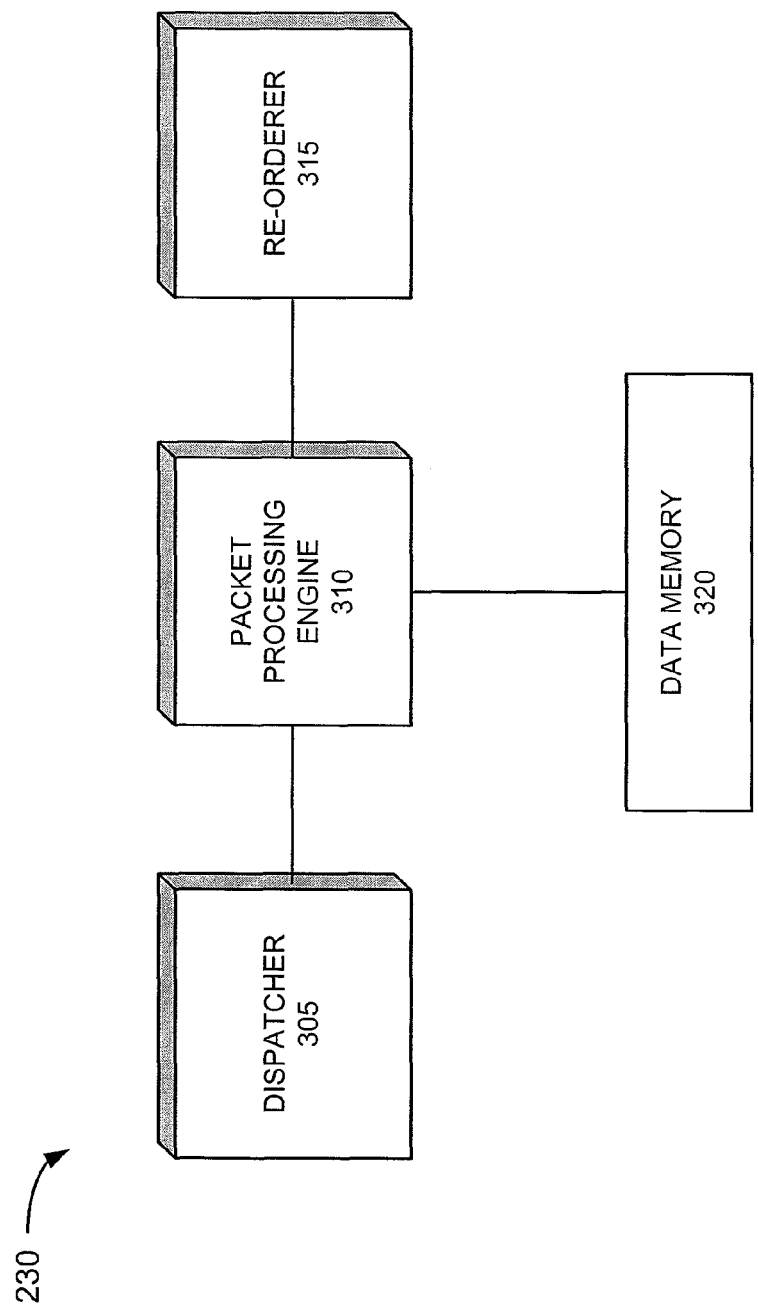

US 8,467,285 B2

NO SPLIT VIRTUAL CHASSIS BASED ON PASS THROUGH MODE

RELATED APPLICATION

This application is a continuation of U.S. patent application Ser. No. 12/487,888, filed on Jun. 19, 2009, the disclosure of which is hereby incorporated by reference herein.

BACKGROUND

In a network environment, a virtual chassis may be implemented by allowing a group (e.g., two or more) of routers or switches to behave as a single router or a single switch. In this type of network environment, the group of routers or switches may be grouped or connected together using cables. In order for the routers or switches to communicate with one another, each router or each switch needs to be up and running (versus being down due to a failure). That is, if one of the routers or one of the switches crashes, then routers or switches on one side of the crashed router or the crashed switch will lose connectivity to the other routers or to the other switches connected on the other side of the crashed router or the crashed switch. In such instances, this results in a split.

One solution to this problem is to connect the group of routers or switches in a ring fashion. However, this solution may resolve the issue when only a single router or a single switch crashes. This solution may not resolve the issue when multiple routers or multiple switches crash. Additionally, this solution requires that the routes associated with the crashed router or the crashed switch be reconfigured. In either case, traffic loss may occur.

SUMMARY

According to one implementation, a method may be performed by a network device. The method may include operating in a normal mode to receive and transmit packets, where the network device is one of multiple network devices that operate as a virtual chassis, where the virtual chassis corresponds to a single logical network device; detecting when the network device crashes; initiating a resetting process; and operating in a pass through mode, during the resetting process, where the pass through mode permits packets to be received and transmitted to the network devices of the virtual chassis.

According to another implementation, a network device may include logic to detect a crash of the network device; initiate a rebooting process when the crash is detected; operate in a pass through mode during the rebooting process, where the pass through mode permits a receipt and a transmission of packets with respect to a virtual chassis, the virtual chassis including a group of network devices, which includes the network device, that are connected as a single logical network device; and operate in a normal mode when the rebooting process is completed.

According to yet another implementation, a network device may include means for receiving and transmitting packets according to a normal mode, where the network device is one of multiple network devices that operate as a virtual chassis, the virtual chassis corresponding to a single logical device; means for detecting a crash of the network device; means for initiating a resetting process based on a detection of the crash; and means for switching the network device from a crashed normal mode to a pass through mode while the network device is resetting, the pass through mode permitting packets to be received and transmitted to the network devices of the virtual chassis.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 3A-3G are diagrams illustrating exemplary functional components and exemplary split avoidance architectures of the network device to provide a pass through mode of the network device.

DETAILED DESCRIPTION

The following detailed description refers to the accompanying drawings. The same reference numbers in different drawings may identify the same or similar elements. Also, the following description does not limit the invention. Rather, the scope of the invention is defined by the appended claims and equivalents.

The term "packet," as used herein, may refer to a packet, a datagram, a frame, or a cell; a fragment of a packet, a fragment of a datagram, a fragment of a frame, a fragment of a cell; or another type or arrangement of data.

Embodiments described herein provide for methods, devices, and systems that prevent a split with respect to a virtual chassis when one or more of the switches or routers of the virtual chassis crash. For example, a virtual chassis may be implemented by allowing a group (e.g., two or more) of routers or switches to behave as a single router or a single switch (e.g., as a single logical network device). As will be described, when the crashed router or the crashed switch crashes, the crashed router or the crashed switch may operate in a pass through mode. While in this pass through mode, packets entering at one virtual chassis port may be transmitted or passed through to another virtual chassis port. In such an instance, the crashed router or the crashed switch may be virtually removed from the virtual chassis. The remaining routers or switches may operate as if the crashed router or the crashed switch has been removed from the virtual chassis group. Once the crashed router or the crashed switch resets and is operating normally again, the crashed switch or the crashed router may switch from the pass through mode to a normal mode (e.g., a virtual chassis mode).

Figure 1A:
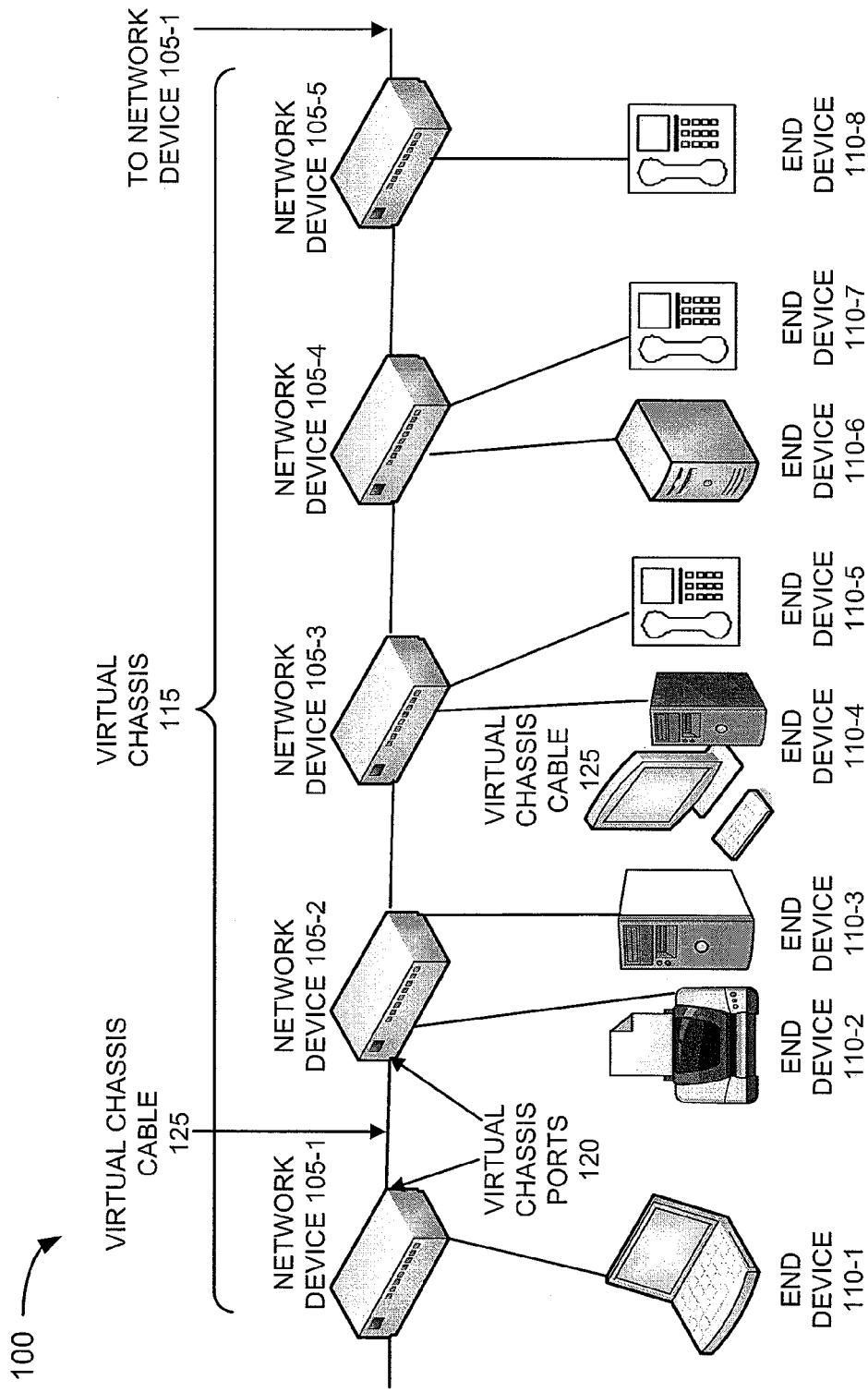
FIGS. 1A and 1B are diagrams illustrating an overview of exemplary embodiments described herein.
Figure 1B:
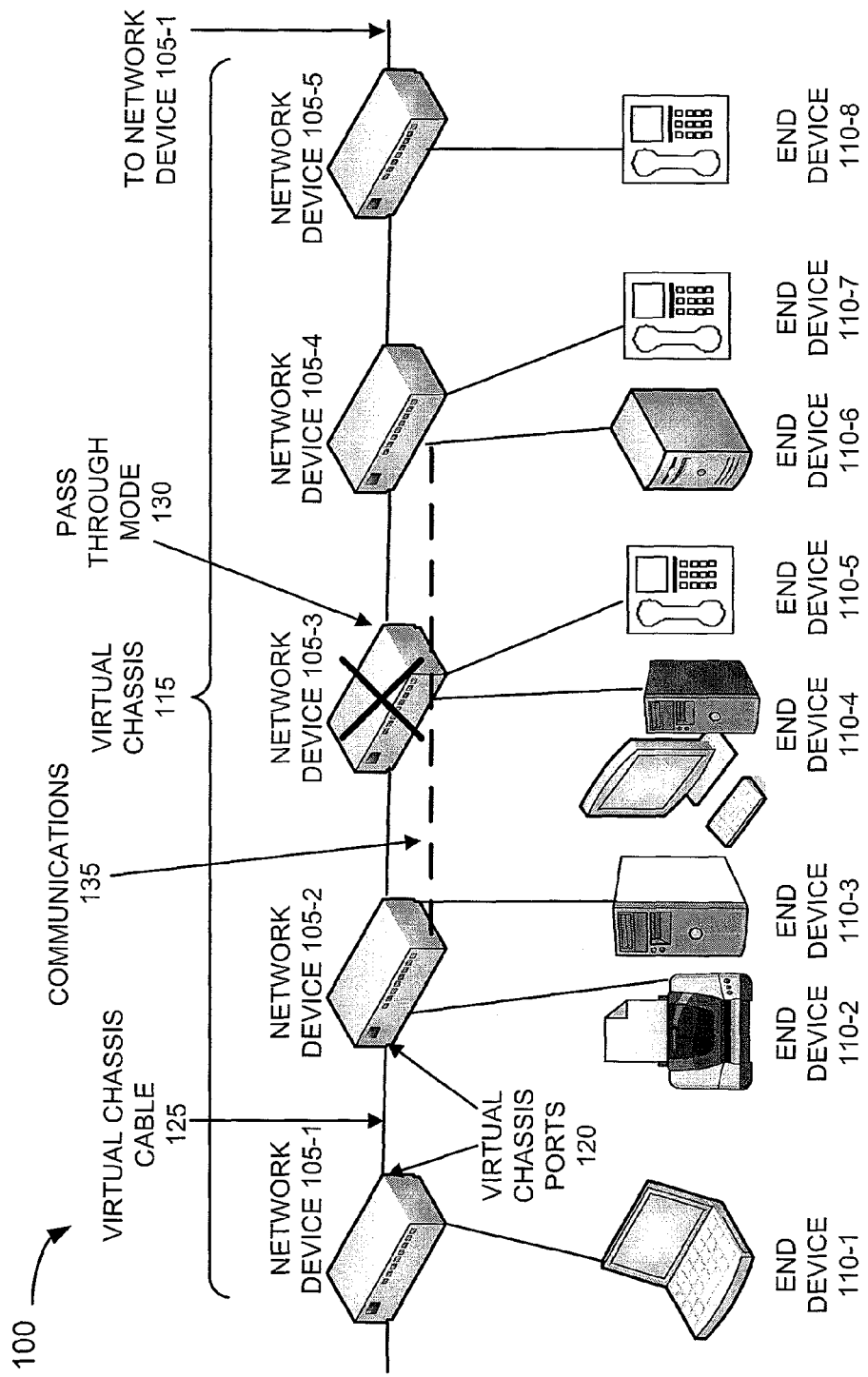

FIGS. 1A and 1B are diagrams illustrating an overview of exemplary embodiments described herein. By way of example, an exemplary environment 100 may include network devices 105-1 through 105-5 (referred to generally as network device 105) and end devices 110-1 through 110-8 (referred to generally as end device 110). The group of network devices 105 may be considered a virtual chassis 115. Each network device 105 may include virtual chassis ports 120 which permit network device 105 to interconnect with another network device 105 via virtual chassis cable 125. For example, in a ring configuration, network device 105-5 may be interconnected to network device 105-4 and network device 105-1.

The number of devices and configuration in environment 100 is exemplary and provided for simplicity. In practice, environment 100 may include more, fewer, different, and/or differently arranged devices than those illustrated in FIGS. 1A and 1B. For example, while FIGS. 1A and 1B illustrate five network devices 105, environment 100 may include more than or less than five network devices 105. Environment 100 may include wired and/or wireless connections among the devices.

As previously described, virtual chassis 115 may permit a group of network devices 105 to interconnect to create a single logical device. All of network devices 105 may be managed as a single network device 105.

Network device 105 may include a device having the capability to communicate with other devices, systems, networks, and/or the like. For example, network device 105 may correspond to a router, a switch (e.g., an Ethernet switch), a network device that provides layer 2 and/or layer 3 functionality, or some other type of communication device that may process and/or forward network traffic. Network device 105 may connect to various end devices 110.

End device 110 may include a device having the capability to communicate with other devices, systems, networks, and/or the like. For example, end device 110 may include a computer (e.g., a laptop, a desktop), a printer, a server, a telephone, or some other type of user device.

Referring to FIG. 1A, in an exemplary operation, assume that network devices 105 are operating in a normal mode, where packets may be received, processed, and transmitted. Referring to FIG. 1B, assume that network device 105-3 crashes (e.g., a software crash). In this instance, network device 105-3 may need to be reset, however, packets may still be received and transmitted by network 105-3 while network device 105 is in a crashed state. For example, when network device 105-3 crashes, network device 105-3 may automatically operate in a pass through mode 130. While in pass through mode 130, network device 105-3 may pass or forward packets via its virtual chassis ports 120 to allow communications 135 between network devices 105-1, 105-2, 105-4, and 105-5, and prevent a split from occurring. Based on this approach, time delays may be avoided and traffic loss significantly reduced.

For example, in an existing approach, for a packet to be delivered to network device 105-2 to network device 105-4, there may be two paths (since it is assumed that network devices 105 are configured in a ring fashion). A first path may be from network device 105-2 to network device 105-4 via network device 105-3. A second path may be from network device 105-2 to network device 105-4 via network devices 105-1 and 105-2. In this existing approach, however, network device 105-2 may select one path (e.g., the first path) and block the other path (e.g., the second path). For example, assume that network device 105-2 selects the first path because it is shorter. Under this framework, when network device 105-3 crashes, network device 105-2 needs to recognize that the link between network device 105-2 to network device 105-3 is down (e.g., based on keep alive packets). Subsequently, network device 105-2 would recalculate a new path and install the new path. In such instances, there may be a time delay that transpires which may negatively impact the delivery of packets. Further, if network device 105-1 were also to crash, under such an approach, it would not be possible for network device 105-2 to reach, for example, network device 105-4. In contradistinction, according to the approach described herein, network device 105 may significantly minimize any time delays and any adverse impact on traffic.

As a result of the foregoing, time delays associated with one or multiple network devices 105 crashing may be avoided. Network devices 105 that have not crashed may continue to operate in normal mode (e.g., virtual chassis mode) and may not have to recognize that one or multiple network devices have crashed and/or reconfigure for alternate paths. Since the embodiments have been broadly described, variations exist. Accordingly, a detailed description of the embodiments is provided below.

Exemplary Network Device Architecture

Figure 2:
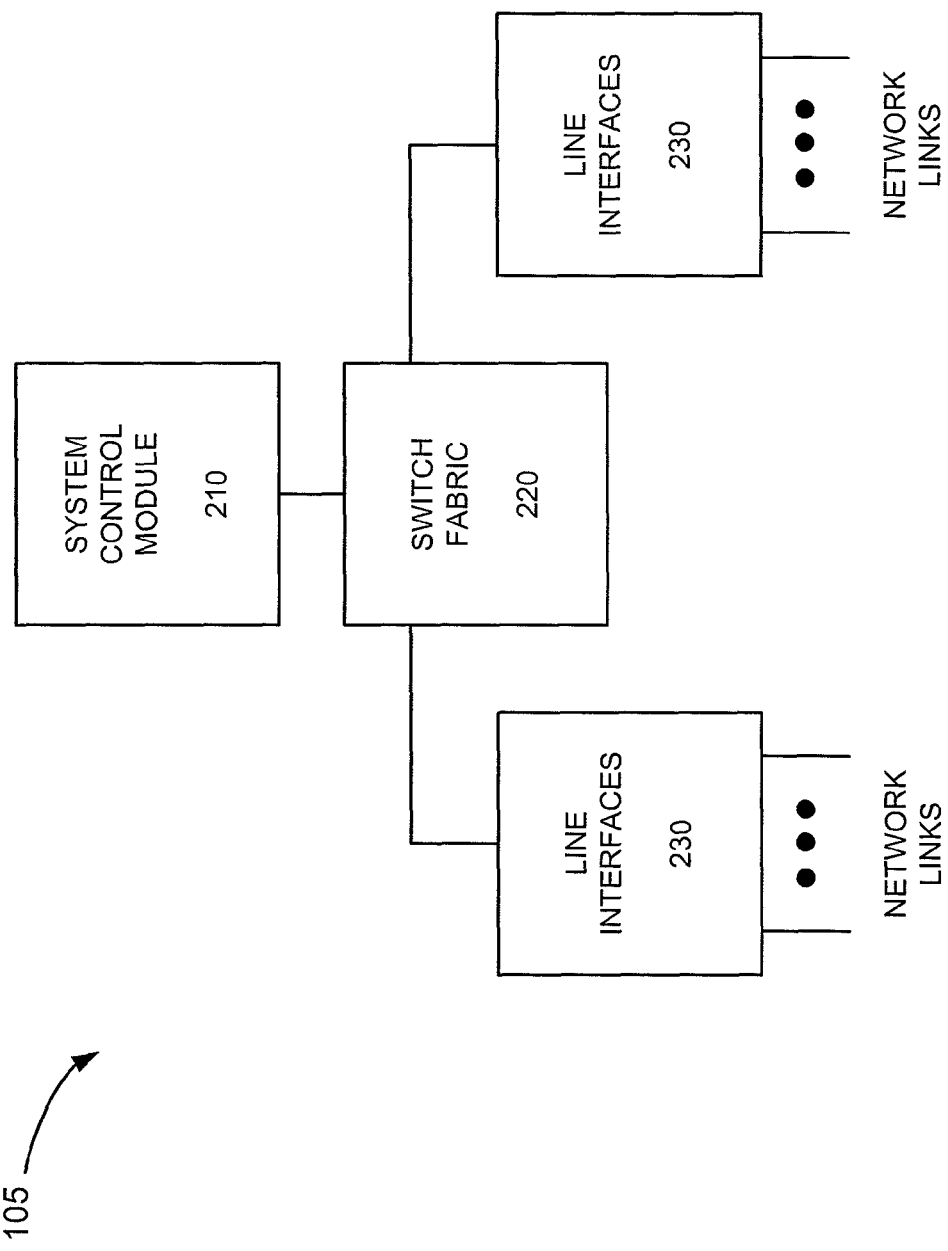
FIG. 2 is a diagram illustrating exemplary components of a network device depicted in FIGS. 1A and 1B.

FIG. 2 is a diagram illustrating exemplary components of network device 105. As illustrated in FIG. 2, network device 105 may include, for example, a system control module 210, a switch fabric 220, and a group of line interfaces 230.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 105. For example, system control module 210 may communicate with other networks, devices, and/or systems connected to network device 105 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and interfaces 230.

Line interfaces 230 may include devices or assemblies, such as line cards, for receiving incoming data units from network links (or from other line interfaces 230) and for transmitting the data units to network links (or to other line interfaces 230). For example, line interfaces 230 may include wireless and/or wireless interfaces, such as, Ethernet interfaces, optical carrier (OC) interfaces, and/or asynchronous transfer mode (ATM) interfaces. Line interfaces 230 may manage a set of input ports via which data units can be received and a set of output ports via which data units can be transmitted. Line interfaces 230 may include memory, one or more processors, and/or other logic.

Depending on the implementation, the components that are illustrated in FIG. 2 may provide fewer or additional functionalities. For example, if network device 105 performs an Internet Protocol (IP) data unit routing function as part of a MPLS router, system control module 210 may perform tasks associated with obtaining routing information from other routers in a MPLS network. In such cases, conveying network traffic from one interface to another may involve label-based routing, rather than IP address-based routing.

Network device 105 may perform operations and/or processes related to routing and/or switching. According to an exemplary implementation, network device 105 may perform these operations and/or processes in response to system control module 210 executing sequences of instructions contained in a computer-readable medium. For example, software instructions may be read into a memory from another computer-readable medium or from another device via interfaces 230. The software instructions contained in the memory may cause system control module 210 to perform processes that are described herein. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of network device 105, in other implementations, network device 105 may include additional, fewer, different, or differently arranged components than those illustrated in FIG. 2 and described herein. Additionally, or alternatively, one or more operations described as being performed by a particular component of network device 105 may be performed by one or more other components, in addition to or instead of the particular component.

Exemplary Line Interface Architecture

FIG. 3A is a diagram illustrating exemplary functional components of each of line interfaces 230. The functional components illustrated in FIG. 3A may be implemented by hardware (e.g., one or more processors or other processing logic) or a combination of hardware and software. As illustrated, line interfaces 230 may include a dispatcher 305, a packet processing engine (PPE) 310, a re-orderer 315, and a data memory 320.

Dispatcher 305 may serve packets or portions of packets (e.g., headers of packets) to PPE 310. Dispatcher 305 may store a packet or a portion of a packet in a memory associated with PPE 310. Dispatcher 305 may receive an indication (e.g., a signal) from re-orderer 315 that the packet or the portion of the packet has been processed by PPE 310. Dispatcher 305 may re-utilize resources for other incoming packets based on this indication.

PPE 310 may provide for input, route lookup, and output processing of packets. PPE 310 may consult data memory 320 to perform routing lookups, classification of packets (e.g., for security purposes), policy-based routing, quality of service (QoS) routing, filtering of packets, and other forms of packet processing (e.g., packet statistical processing, accounting, and/or encapsulation). PPE 310 may perform one or more packet processing operations (e.g., packet parsing, route lookup, packet rewriting, nexthop determinations, K-Tree determinations, and/or firewall determinations) based on microinstructions. The microinstructions may be generated by compiling source code for an application or part of an operation system (OS), such as, for example, Juniper Operating System (JUNOS), Cisco Internet Operating System (IOS), and the like. PPE 310 may execute the microinstructions in one or more processes or threads.

Re-orderer 315 may retrieve the packets or portions of the packets from a memory associated with PPE 310 if the PPE processes are completed. Re-orderer 315 may manage the order of the packets or portions thereof when the packets or the portions of the packets are associated with the same packet flow (i.e., data flow). Re-orderer 315 may pass the packets or the portions of the packets for output by network device 105.

Data memory 320 may store various types of data related to packet processing. For example, data memory 320 may store a forwarding information base (FIB), a K-tree (e.g., a binary tree for route lookup), hash table data structures, counters, routing policies, and instruction sets (e.g., nexthop instruction sets, K-tree instruction sets, etc.).

Although FIG. 3A illustrates exemplary functional components of line interface 230, in other embodiments line interfaces 230 may include fewer, additional, and/or different functional components than those depicted in FIG. 3A. In still other embodiments, one or more functional components of line interfaces 230 may perform one or more other tasks described as being performed by one or more other functional components of line interfaces 230. Additionally, dispatcher 305, PPE 310, re-orderer 315, and/or data memory 320 may be implemented in a component of network device 105, other than line interfaces 230.

Exemplary Split Avoidance Architectures

As previously described, when network device 105 crashes, network device 105 may operate in a pass through mode so that packets received during the time network device 105 is crashed and/or during the time network device 105 may be resetting itself to operate in a normal mode (e.g., a virtual chassis mode), the packets may be timely delivered and are not adversely impacted by the crash and/or the reset. For example, network device 105 may operate in a pass through mode that allows the received packets to be transmitted from one virtual chassis port to another virtual chassis port. The mapping of one virtual chassis port to another virtual chassis port may, for example, be preconfigured and/or based on some default setting. This mapping may permit network device 105 to pass packets to other network devices 105. For example, referring to FIG. 1B, when network device 105-3 crashes, the mapping of virtual chassis ports 120 may permit packets to pass from network 105-4 to network device 105-2 via network device 105-3, and vice versa.

Figure 3B:
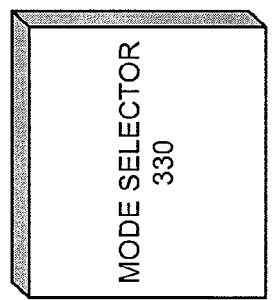
Figure 3B:
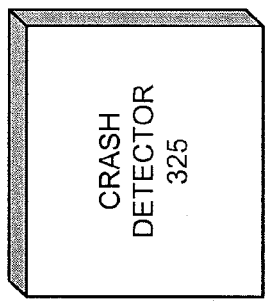
Figure 3C:
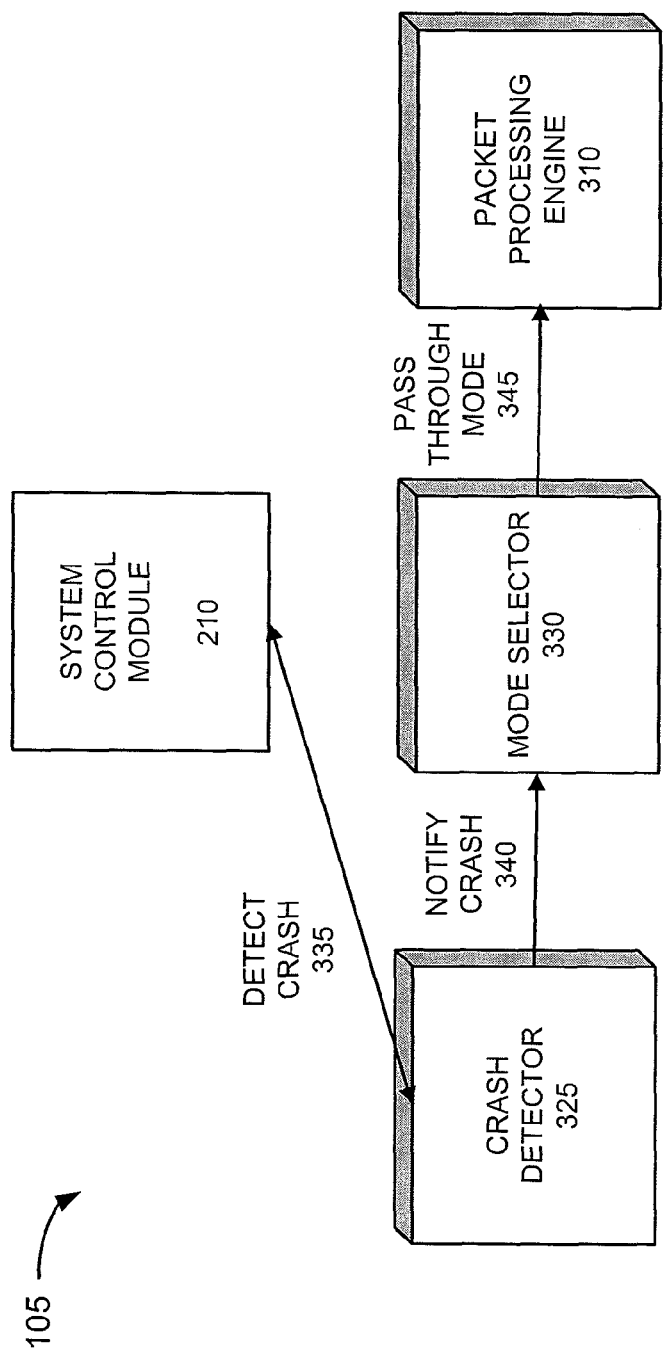

FIGS. 3B and 3C illustrate an exemplary embodiment of a split avoidance architecture. FIG. 3B is a diagram illustrating exemplary functional components of network device 105. As illustrated in FIG. 3B, network device 105 may include a crash detector 325 and a mode selector 330. The functional components illustrated in FIG. 3B may be implemented by hardware (e.g., one or more processors or other processing logic) or a combination of hardware and software. While a particular number and arrangement of components are illustrated in FIG. 3B and FIG. 3C, in other implementations, network device 105 may include fewer, additional, different, or differently arranged components than those illustrated in FIG. 3B and FIG. 3C.

Referring to FIG. 3B, crash detector 325 may detect when a network device 105 crashes. For example, crash detector 325 may detect when, for example, an operating system and/or other applications of network device 105 are no longer operating properly, and/or network device 105 is in an unhealthy state. In one implementation, crash detector 325 may periodically check various systems of network device 105 to determine their operating state. In other implementations, crash detector 325 may check various systems of network device 105 in a non-periodic or reactive manner.

Mode Selector 330 may select and/or control a mode in which network device operates. For example, when network device 105 crashes, mode selector 330 may place network device 105 (e.g., PPE 310) in a pass through mode while network device 105 is being restored or reset.

Although FIG. 3B illustrates exemplary functional components of a split avoidance architecture, in other embodiments network device 105 may include fewer, additional, and/or different functional components than those depicted in FIG. 3B.

FIG. 3C is a diagram illustrating an exemplary scenario in which the functional components (e.g., crash detector 325 and mode selector 330) may operate to avoid a split from occurring. Referring to FIG. 3C, by way of example, but limited thereto, crash detector 325 may monitor system control module 210 to detect when a crash occurs. When crash detector 325 detects a crash 335, crash detector 325 may notify 340 mode selector 330 of the crash. Mode selector 330 may place PPE 310 in a pass through mode 345. While in pass through mode 345, network device 105 may pass or forward packets received to other network devices 105 until network device 105 is reset or operating in a normal mode (e.g., in a virtual chassis mode). In this way, PPE 310 may be self-programmed even when, for example, central processing unit (CPU) subsystems (e.g., system control module 210, the operating system, and/or other software) may not be operational in network device 105.

Although FIG. 3C illustrates an exemplary scenario in which the functional components may operate to avoid a split from occurring, in other embodiments, the functional components may perform fewer, additional, and/or different operations than those depicted in FIG. 3C and described thereto.

Figure 3D:
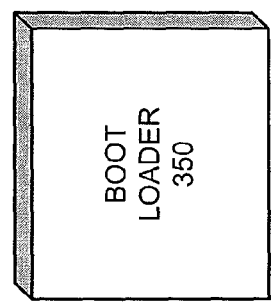
Figure 3E:
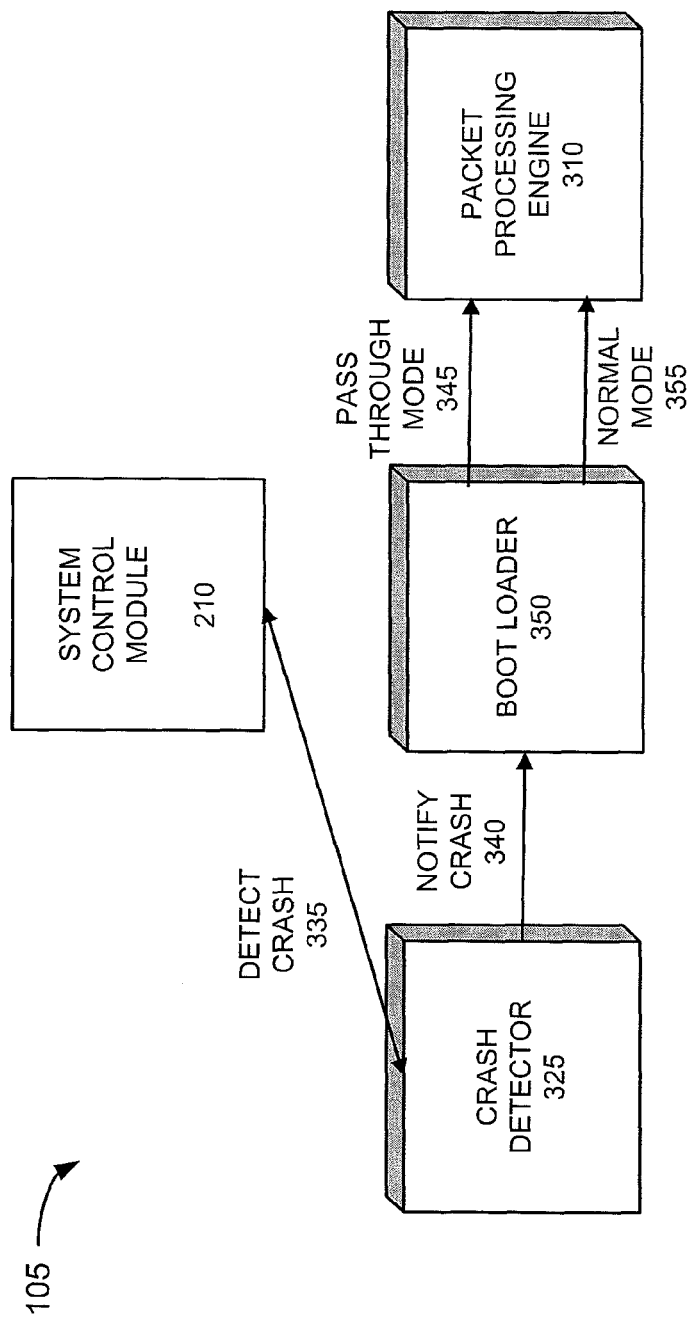

FIGS. 3D and 3E illustrate another exemplary embodiment of a split avoidance architecture. FIG. 3D is a diagram illustrating an exemplary functional component of network device 105. As illustrated in FIG. 3D, network device 105 may include a boot loader 350. The functional component illustrated in FIG. 3D may be implemented by hardware (e.g., one or more processors or other processing logic) or a combination of hardware and software.

Boot loader 350 may reset or reboot network device 105 when network device 105 crashes. During the resetting or rebooting stage, boot loader 350 may place network device 105 (e.g., PPE 310) in a pass through mode. As network device 105 is performing resetting or rebooting processes (e.g., by boot loader 350), network device 105 may still be able to receive and transmit packets to other network devices 105. As the rebooting or resetting processes continues, boot loader 350 may switch network device 105 (e.g., PPE 310) from pass through mode to normal mode. However, in some instances, where rebooting processes may be unsuccessful, network device 105 may remain in pass through mode.

FIG. 3E is a diagram illustrating an exemplary scenario in which boot loader 350 may operate to avoid a split from occurring. Referring to FIG. 3E, by way of example, but not limited thereto, crash detector 325 may monitor system control module 210 to detect when a crash occurs. When crash detector 325 detects a crash 335, crash detector 325 may notify 340 boot loader 350 of the crash. Boot loader 350 may place PPE 310 in a pass through mode 345 and provide for rebooting or resetting processes. Boot loader 350 may continue with resetting or rebooting processes. In instances when the rebooting or resetting process is progressing successfully, boot loader 350 may place PPE 310 in normal mode 355. In this way, for example, when network device 105 may not permit PPE 310 to be self-programmed to operate in pass through mode, boot loader 350 may place PPE 310 in a pass through mode.

Although FIG. 3E illustrates an exemplary scenario in which the functional components may operate to avoid a split from occurring, in other embodiments, the functional components may perform fewer, additional, and/or different operations than those depicted in FIG. 3E and described thereto.

Figure 3F:
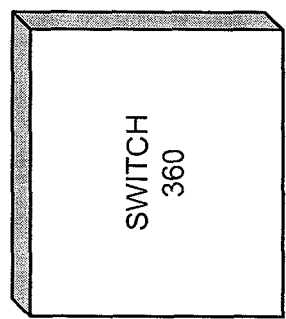
Figure 3G:
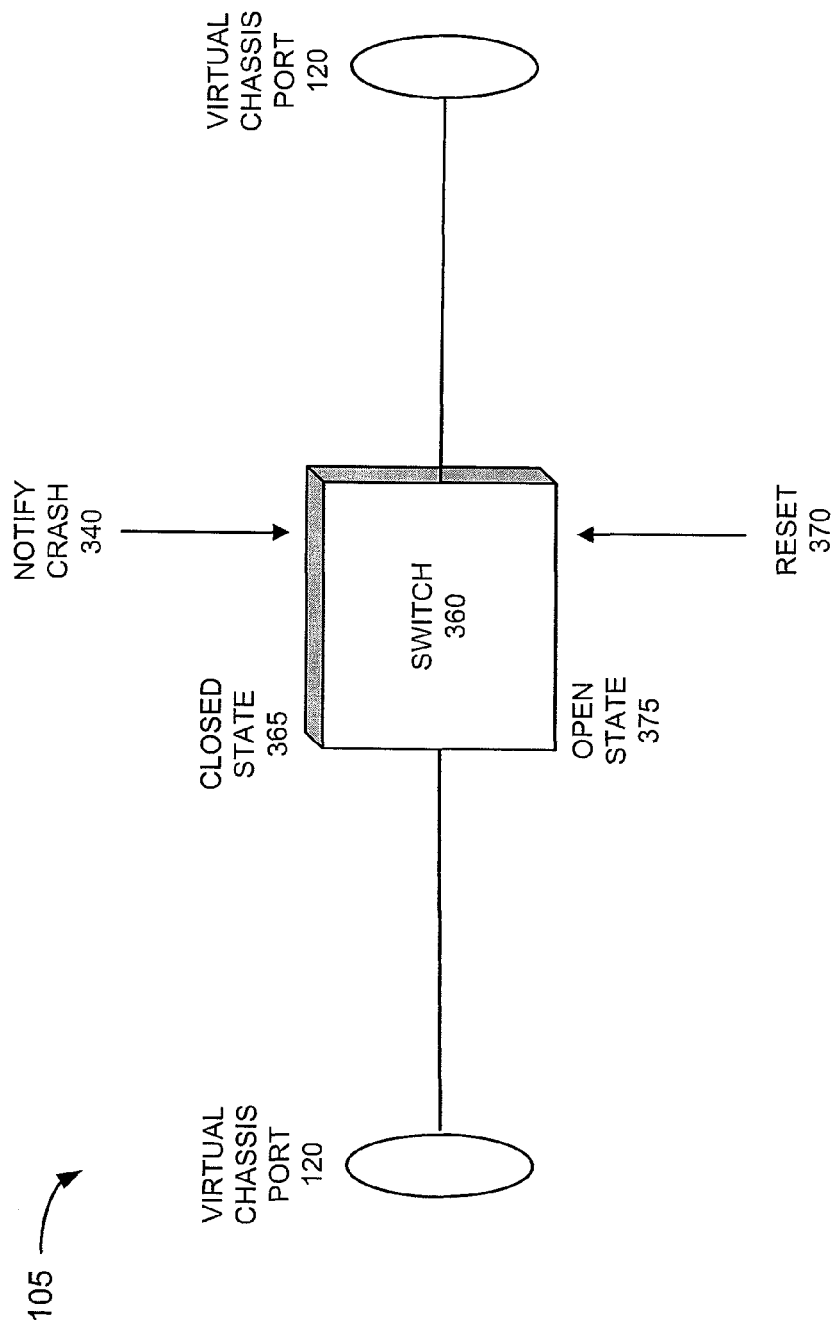

FIGS. 3F and 3G illustrate yet another exemplary embodiment of a split avoidance architecture. FIG. 3F is a diagram illustrating an exemplary functional component of network device 105. As illustrated in FIG. 3F, network device 105 may include a switch 360. The functional components illustrated in FIG. 3F may be implemented by hardware (e.g., one or more processors or other processing logic) or a combination of hardware and software. For example, switch 360 may correspond to a switch, a relay, or a multiplexer (e.g., a cross attachment unit interface (XAUI) MUX).

Switch 360 may provide a connection between virtual ports 120 to permit pass through mode. Switch 360 may change states (e.g., an open state to a closed state, and vice versa) depending on the state of network device 105 (e.g., a crashed state, a reboot state, a normal mode state, etc.). Switch 360 may be implemented in switch fabric 220.

FIG. 3G is a diagram illustrating an exemplary scenario in which switch 360 may operate to avoid a split from occurring. Referring to FIG. 3G, by way of example, but limited thereto, when network device 105 crashes, switch 360 may be notified 340 of the crash (e.g., by crash detector 325). Switch 360 may operate in a closed state so that packets may be passed through virtual ports 120. When network device 105 is reset or rebooted successfully, switch 360 may be notified of a reset 370. Switch 360 may operate in an open state in which packets may be received and/or transmitted in normal mode. In this way, for example, network device 105 (e.g., PPE 310) may operate in pass through mode, even when PPE 310 does not have the capability of a pass through mode on its own.

Examplary Process

Figure 4:
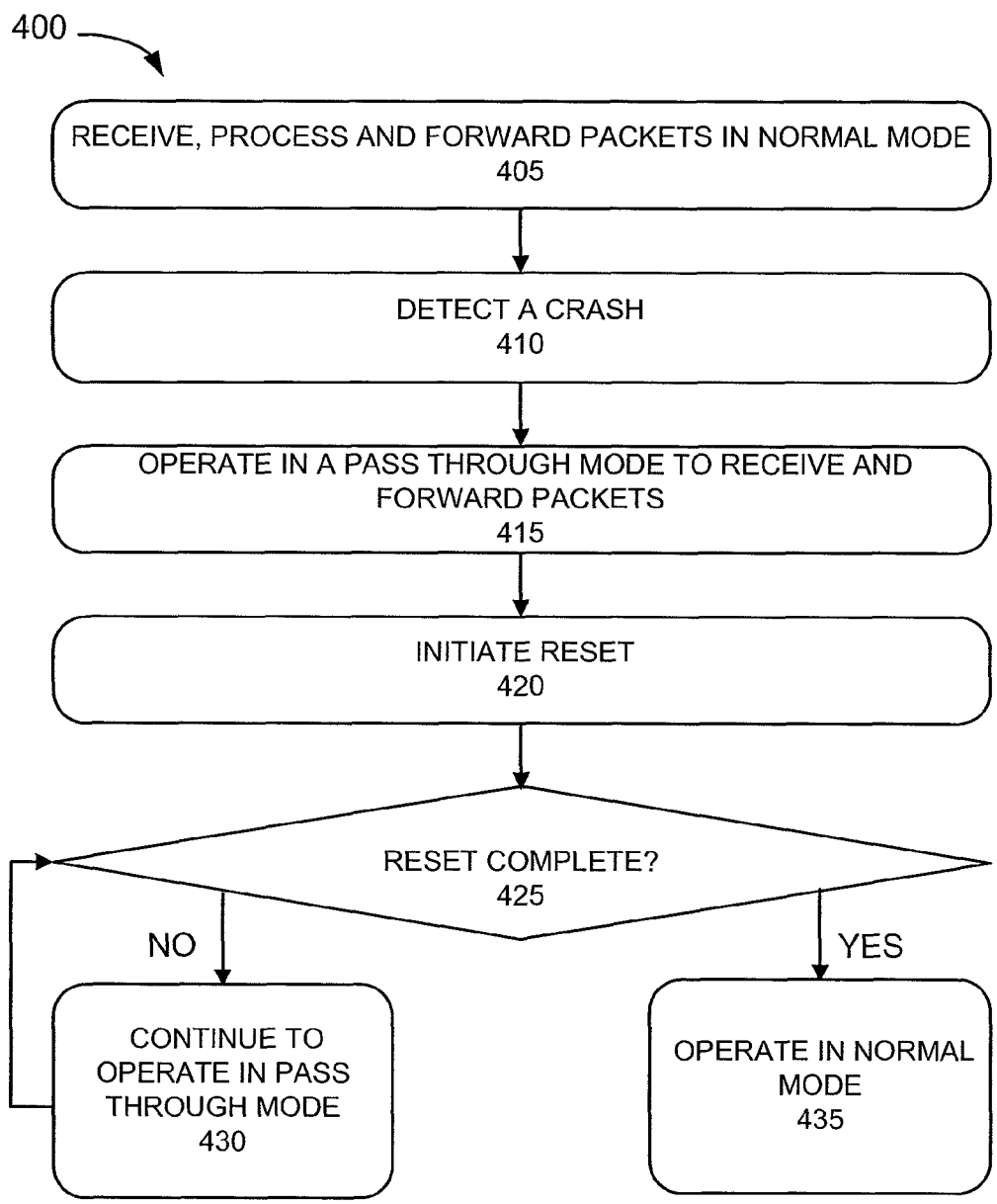
FIG. 4 is a flow diagram illustrating an exemplary process for operating in pass through mode when a crash occurs.

FIG. 4 is a diagram illustrating an exemplary process 400 for operating in pass through mode when a crash occurs. As previously described, process 400 may be performed by one or more of network devices 105 of virtual chassis 115. Various split avoidance architectures for network device 105, as illustrated in FIGS. 3A-3G, and described herein, may perform one or more of the operations associated with process 400.

Process 400 may begin with receiving, processing, and forwarding packets in a normal mode (block 405). For example, each of network devices 105, as illustrated in FIG. 1A, may receive, process, and forward packets to one another. Network devices 105 may be grouped and operate as a virtual chassis, as previously described.

A crash may be detected (block 410). Network device 105 may detect a crash. For example, crash detector 325 may detect a crash and/or some other type of network device state that will cause network device 105 to reset or reboot.

Network device may operate in a pass through mode to receive and forward packets (block 415). For example, PPE 310 may operate in a pass through mode such that packets received may be transmitted to other network devices 105 via virtual chassis ports 120. For example, network device 105 may behave similar to a repeater by receiving packets and transmitting the packets unaltered. PPE 310 may select an appropriate virtual chassis port 120 to pass packets to other network devices 105. In one embodiment, PPE 310 may select the appropriate virtual chassis port 120 based on a default virtual chassis port mapping.

A reset may be initiated (block 420). Network device 105 may reset or reboot based on the detected crash. For example, boot loader 350 may initiate the resetting or rebooting of network device 105. In other embodiments, network device 105 may include other components that automatically initiate the resetting or rebooting of network device 105. The resetting or rebooting process may include resetting an operating system associated with network device 105.

It may be determined whether the reset is complete (block 425). For example, boot loader 350 or some other component that carries out the resetting or rebooting process of network device 105 may determine when or at what stage of the resetting or rebooting process that PPE 310 should be reset to normal mode.

When it is determined that the reset is not complete (block 425—NO), network device 105 may continue to operate in pass through mode (block 430). For example, PPE 310 may continue to operate in pass through mode until the reset is completed and/or the resetting or the rebooting process provides that PPE 310 operate in normal mode.

When it is determined that the reset is complete (block 425—YES), network device 105 may operate in normal mode (block 435). For example, PPE 310 may operate in normal mode (e.g., virtual chassis mode) during or upon the completion of the resetting or rebooting process.

Although FIG. 4 illustrates an exemplary process 400, in other implementations, additional, fewer, and/or different operations than those described, may be performed.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 4, the order of the blocks may be modified in other implementations. For example, block 415 and block 420 may be performed in reverse order. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium. The computer-readable medium may include, for example, a memory or some other type of medium (e.g., a compact disc (CD), a digital versatile disc (DVD), secondary storage, or the like) that may store instructions. The computer-readable medium may include a physical memory device or a logical memory device. A logical memory device may include memory space within a single physical memory device or spread across multiple physical memory devices.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A network device comprising:
a physical port associated with a virtual port of a logical network device, the logical network device including the network device and other network devices,
when the network device is in a first operating mode, a packet processor is to receive, via the virtual port, one or more packets transmitted through the logical network device, and
a switch coupled to the physical port, the switch being to:
detect a failure of the packet processor,
change, based on detecting the failure of the packet processor, the network device from the first operating mode to a second operating mode, and
operate the network device in the second operating mode while an operation is performed to fix the failure of the packet processor,
the second operating mode being a pass through mode that permits packets to be received by the packet processor and transmitted, by the packet processor, to at least one of the other network devices.

2. The network device of claim 1, where the network device and the other network devices are connected in a ring fashion to form the logical network device.

3. The network device of claim 1, where the packet processor is included in the network device.

4. The network device of claim 1, where the switch, when changing the network device from the first operating mode to the second operating mode, is further to:
initiate a reset of the packet processor;
determine if the reset is complete;
operate the packet processor in the first operating mode when the reset is complete; and
operate the packet processor in the second operating mode when the reset is not complete.

5. The network device of claim 1, where the switch, when changing the network device from the first operating mode to the second operating mode, is further to:
cause the packet processor to be reset while the network device is in the second operating mode, and
change, after the packet processor is reset, the network device from the second operating mode to the first operating mode.

6. The network device of claim 1, where the switch, when detecting the failure of the packet processor, is further to:
identify the failure of the packet processor when a packet is not resent from the packet processor, via the virtual port, within a particular time period after being received by the packet processor.

7. The network device of claim 1, where the switch is further to:
change the network device from the first operating mode to the second operating mode based on detecting, after detecting the failure of the packet processor, receipt of additional packets via the virtual port.

8. A non-transitory computer-readable medium storing instructions, the instructions comprising:

one or more instructions, which, when executed by a device, cause the device to:
monitor a first network device,
the first network device and a second network device being included in a virtual device;
detect a failure of the first network device;
change, based on detecting the failure of the first network device, the first network device from a first operating mode to a second operating mode; and
operate the first network device in the second operating mode while an operation is performed to fix the failure of the first network device,
the second operating mode being a pass through mode that permits packets to be received by the first network device and transmitted, by the first network device, to the second network device.

9. The computer-readable medium of claim 8, where the device is included in the first network device.

10. The computer-readable medium of claim 8, where the device is included in the second network device.

11. The computer-readable medium of claim 8, where the one or more instructions further include:
one or more instructions to cause, based on detecting the failure, the first network device to be reset, and
one or more instructions to change, after the first network device is reset, the first network device from the second operating mode to the first operating mode.

12. The computer-readable medium of claim 8, where the one or more instructions to monitor the first network device further include:
one or more instructions to monitor traffic received by the first network device, and
where the one or more instructions to detect the failure of the first network device further include:
one or more instructions to detect the failure based on the traffic not being received at the second network device within a particular time period after being received by the first network device.

13. The computer-readable medium of claim 8, where the packets are received via a first virtual port, of the virtual device, that is associated with the first network device, and the one or more instructions further include:
one or more instructions to:
transmit the packets to a second virtual port, of the virtual device, that is associated with the second network device.

14. The computer-readable medium of claim 8, where the one or more instructions further include:
one or more instructions to send, to the second network device, a notification indicating the failure of the first network device.

15. A method comprising:
monitoring, by a device, a first network device,
the first network device and a second network device being included as part of a virtual device;
detecting, by the device, a failure of the first network device;
changing, by the device and based on detecting the failure of the first network device, the first network device from a first operating mode to a second operating mode; and
operating, by the device, the first network device in the second operating mode while an operation is performed to fix the failure of the first network device,
the second operating mode being a pass through mode that permits packets to be received by the first network device and transmitted, by the first network device, to the second network device.

16. The method of claim 15, where the device is coupled to the first network device.

17. The method of claim 15, where the device is coupled to the second network device.

18. The method of claim 15, further comprising:
causing, based on detecting the failure, maintenance to be performed on the first network device;
determining if the maintenance is complete;
operating the first network device in the first operating mode when the maintenance is complete; and
operating the first network device in the second operating mode when the maintenance is not complete.

19. The method of claim 15, where monitoring the first network device includes:
monitoring packets received at the first network device, and
where detecting the failure of the first network device further includes:
detecting the failure based on the packets not being received at the second network device within a particular time period of being received by the first network device.

20. The method of claim 15, where the packets are received via a first virtual port, of the virtual device, that is coupled to the first network device, and
where the packets are transmitted to a second virtual port, of the virtual device, that is coupled to the second network device, where the first virtual port differs from the second virtual port.

* * * * *